Aug. 7, 1934.  E. J. STEIN  1,969,584
CUTTING TABLE
Filed Feb. 18, 1931
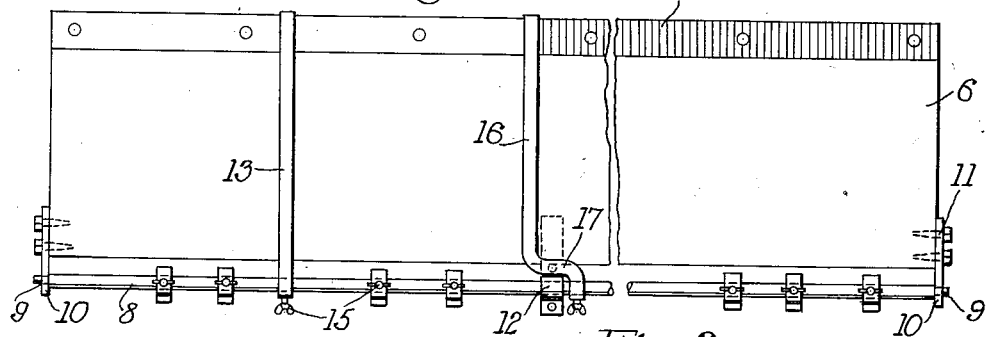
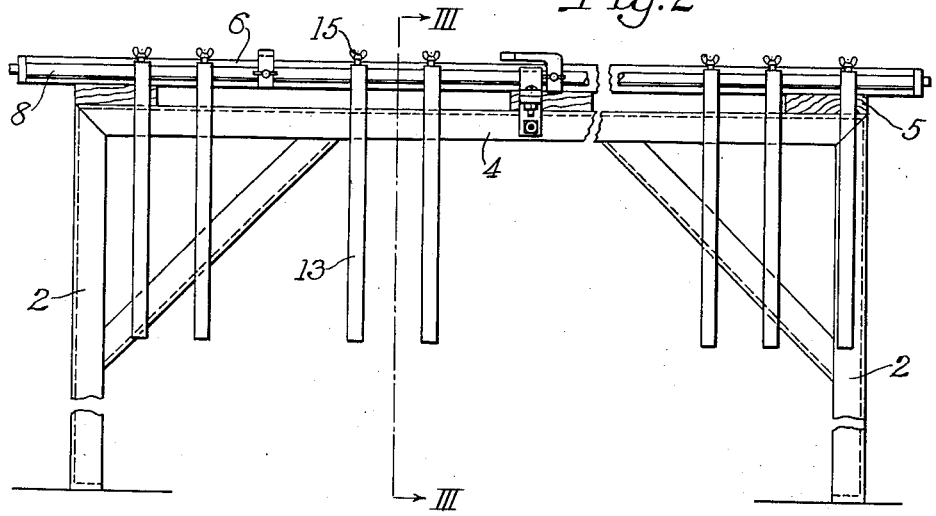
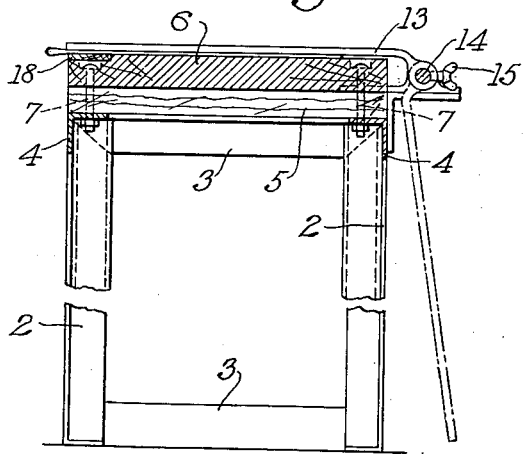
INVENTOR Patented Aug. 7, 1934

1,969,584

UNITED STATES PATENT OFFICE 1,969,584

CUTTING TABLE

Edward J. Stein, Belle Vernon, Pa., assignor to American Window Glass Company, Pittsburgh, Pa., a corporation of Pennsylvania Application February 18, 1931, Serial No. 516,702

3 Claims. (Cl. 33—76)

My invention relates broadly to tables, and more particularly to tables adapted to be used for the cutting of sheet glass.

By my invention I provide an improved cutting table which is adapted to support a sheet of glass during the cutting thereof and which has attached thereto a plurality of improved cutting guides which are adapted to be swung from an inoperative position alongside the table to an operative position on the top thereof. I further provide by my invention a cutting table having cutting guides attached thereto which not only may be swung from an inoperative position alongside the table to an operative position on the top, but which may be adjusted longitudinally along the table top so as to permit the cutting of sheets of the desired size. I further provide a scale in combination with the guides which enables the accurate cutting of the sheets. By means of the table which I provide, glass sheets may be more efficiently and more accurately cut.

In the accompanying drawing I have shown for purposes of illustration only a preferred embodiment of my invention.

In the drawing—

Figure 1 is a plan view of the table which I provide;

Figure 2 is an elevational view of the table shown in Figure 1; and

Figure 3 is a sectional view taken along the line III—III of Figure 2, a cutting guide being shown thereon in solid lines in operative position on the top of the table and in inoperative position in dotted lines.

The legs 2 of the table shown in the drawing are made of angle irons and are joined at the bottom and top thereof by transverse angle irons 3. They are also joined at the top thereof by longitudinally extending angle irons 4. A plurality of cross bars 5 are laid on the top of angle irons 4. The table top 6 is placed on top of the cross bars 5 and bolted to the angle irons 4 by means of bolts 7 which are countersunk in the top 6.

A longitudinally extending rod 8 is provided on one side of the table. The rod 8 is supported at each end in bearings 9 in strips 10 which are attached to the ends of the table as at 11. The rod 8 is rotatable in the bearings 9. This transversely extending rod is supported near the center of the table by means of a bearing 12.

A plurality of cutting guides 13 are pivotally mounted on the rod 8 as at 14 and are adapted to freely rotate thereon. A screw 15 is provided for the purpose of clamping all or any one of the guides 13 to the shaft 8 so as to prevent its rotation on the rod 8 or its movement longitudinally thereof. A guide 16 having an offset arm 17 is provided near the center of the table so that the bearing 12 will not interfere with the cutting operation.

The guides 13 and the guides 16 are normally in inoperative position alongside the table hanging freely from the rod 8, as shown in dotted lines in Figure 3. When the guides are in this position, a sheet of glass may be readily placed on the top of the table without interference from the guides. The guide or guides to be used in a particular cutting operation are rotated on the rod 8 to a position on the top of the table, as shown in solid lines in Figure 3. The guide to be used in cutting may be also moved longitudinally of the table so as to place it in the proper position for cutting.

A graduated scale 18 is countersunk in the top of the table. This scale makes it possible to properly locate the cutting arms so as to accurately cut the desired sizes of sheets of glass. Where a great amount of cutting of sheets of glass of a particular size is to be done, the cutting arms may be clamped to the rod 8, thus making it unnecessary to measure each individual piece and rendering the cutting of the glass more accurate.

While I have shown and described a preferred embodiment of my invention, it is to be understood that it is not to be limited thereby but may be otherwise embodied or practiced within the scope of the following claims.

I claim:

1. A cutting table comprising a top, a supporting structure therefor, a rod rotatably mounted on one side of and extending longitudinally of the table, a plurality of cutting guides rotatably and slidably mounted on said rod, whereby each of said guides may be swung from an inoperative suspended position at one side of the table to a cutting position on the top of the table and adjusted longitudinally of the table, and means for individually clamping each cutting guide to said rod, whereby a plurality of said guides may be simultaneously swung from inoperative to operative position by such movement of one of such clamped guides.

2. A cutting table comprising a top, a supporting structure therefor, a rod rotatably mounted on one side of said table and located below the top surface thereof and extending longitudinally thereof, and a plurality of separate cutting guides rotatably and slidably mounted on said rod, whereby each of said guides may be swung from an inoperative suspended position at one side of the table to a cutting position on the top of the table and adjusted longitudinally of the table.

3. A cutting table comprising a top, a supporting structure therefor, a rod rotatably mounted on one side of said table and located below the top surface thereof and extending longitudinally thereof, a plurality of separate cutting guides rotatably and slidably mounted on said rod whereby each of said guides may be swung from an inoperative suspended position at one side of the table to a cutting position on the top of the table and adjusted longitudinally of the table, and means for individually clamping a plurality of the cutting guides against movement along said rod.

EDWARD J. STEIN.